(12) United States Patent
Komoda

(10) Patent No.: US 9,764,851 B2
(45) Date of Patent: Sep. 19, 2017

(54) FUEL SYSTEM AND AIRCRAFT

(71) Applicant: MITSUBISHI AIRCRAFT CORPORATION, Aichi (JP)

(72) Inventor: Ushio Komoda, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 14/446,863

(22) Filed: Jul. 30, 2014

(65) Prior Publication Data
US 2015/0041004 A1 Feb. 12, 2015

(30) Foreign Application Priority Data

Aug. 7, 2013 (JP) .................. 2013-163987

(51) Int. Cl.
| | |
|---|---|
| *B64D 37/04* | (2006.01) |
| *B64D 37/14* | (2006.01) |
| *B64D 37/22* | (2006.01) |
| *B64C 3/34* | (2006.01) |

(52) U.S. Cl.
CPC ............... *B64D 37/04* (2013.01); *B64C 3/34* (2013.01); *B64D 37/14* (2013.01); *B64D 37/22* (2013.01); *Y02T 50/44* (2013.01); *Y10T 137/85978* (2015.04)

(58) Field of Classification Search
CPC ........ B64D 37/04; B64D 37/14; B64D 37/22; B64C 3/34; Y10T 137/85978
See application file for complete search history.

(56) References Cited

U.S. PATENT DOCUMENTS

| | | | |
|---|---|---|---|
| 7,591,277 B2 * | 9/2009 | Johnson ................. | B64C 17/10 137/1 |
| 8,172,182 B2 * | 5/2012 | Tanner ..................... | B64C 3/34 244/135 B |
| 8,226,040 B2 * | 7/2012 | Neto ....................... | B64C 17/10 244/135 C |
| 2010/0051749 A1 | 3/2010 | Tanner | |
| 2012/0193479 A1 | 8/2012 | Roscoe | |
| 2015/0048210 A1 * | 2/2015 | Montgomery ......... | B64D 37/04 244/135 R |

FOREIGN PATENT DOCUMENTS

JP         08-040394 A        2/1996

OTHER PUBLICATIONS

Office action for Japanese patent application No. 2013-163987 dated Mar. 14, 2017.

* cited by examiner

*Primary Examiner* — Valentina Xavier
(74) *Attorney, Agent, or Firm* — Pearne & Gordon LLP

(57) ABSTRACT

Provided is a fuel system that can reduce the amount of fuel in a second tank before the amount of fuel in a first tank. A fuel system includes: a first tank and a second tank that respectively store fuel; a fuel supply pump that supplies at least the fuel in the first tank out of the first and second tanks to a fuel consuming section; a transfer pump that transfers the fuel in the second tank into the first tank; and a fuel passage having an inlet in communication with an inner portion of the first tank, and an outlet in communication with an inner portion of the second tank. The fuel in the first tank overflows into the second tank through the fuel passage.

15 Claims, 14 Drawing Sheets

FUEL SYSTEM AND AIRCRAFT

BACKGROUND OF THE INVENTION

Field of the Invention

The present invention relates to a fuel system that is mounted on an aircraft or the like.

Description of the Related Art

A wing box provided in aircraft is used as a fuel tank. The wing box extends along substantially the entire length of a main wing, and a fuselage. An inner portion of the wing box is divided into a plurality of fuel tanks as described in Japanese Patent Laid-Open No. 08-40394.

It is assumed that the plurality of fuel tanks include two fuel tanks of an outer tank (a first tank) that is provided in the main wing, and an inner tank (a second tank) that is provided in a root portion of the main wing and the fuselage.

In this configuration, there are a case in which a pump is provided in each of the fuel tanks, and fuel is supplied to an engine from both the fuel tanks, and a case in which a pump is provided only in one of the fuel tanks, and fuel is supplied to an engine from the fuel tank. In the latter case, the fuel is transferred from one of the fuel tanks to the other of the fuel tanks as described in Japanese Patent Laid-Open No. 08-40394.

In view of efficiently supporting the fuel by lift that the main wing receives, it is generally preferable that more fuel is stored in the outer tank than in the inner tank, and the fuel in the inner tank is consumed before the fuel in the outer tank.

In this case, a case in which the fuel is supplied to the engine from both the outer tank and the inner tank (referred to as the former case below), and a case in which the fuel is supplied to the engine only from the outer tank (referred to as the latter case below) are described.

In the former case, a fuel supply pump 18 that pumps the fuel toward the engine, and a valve (not shown) are provided in each of an outer tank 15 and an inner tank 16 as shown in FIG. 14A. The operations of the respective fuel supply pumps 18 and 18 and the valves are electrically controlled based on the fuel amounts in the respective tanks 15 and 16 detected by sensors such that the fuel in the inner tank 16 is reduced first.

In the latter case, the fuel supply pump 18 that pumps the fuel toward the engine is provided in the outer tank 15, and a transfer pump 19 that transfers the fuel from the inner tank 16 to the outer tank 15 is also provided as shown in FIG. 14B. Control as described below is performed. That is, the transfer pump 19 is started, and a valve provided together with the transfer pump 19 is opened to start fuel transfer when the fuel amount in the outer tank 15 falls below a predetermined amount by detecting the fuel amount in the outer tank 15 by a sensor. When the fuel amount in the outer tank 15 reaches a full amount, the transfer pump 19 is stopped, and the valve is closed.

In any of the former and the latter cases, it is necessary to construct a complicated system that electrically controls the pump and the valve.

Thus, the number of necessary members, such as a sensor and a control unit, is increased. From the perspective of decreasing the weight, the cost, and the possibility of failure, the number of members provided in an airframe is desired to be reduced as much as possible.

Particularly, in middle-sized and small-sized aircraft having a smaller airframe than large-sized aircraft, there is a more demand for a decrease in the number of members in view of a space to install the sensor and the control unit.

Based on the above problems, an object of the present invention is to provide a fuel system which achieves, with simple and a small number of members, a configuration in which fuel in a second tank is consumed before fuel in a first tank, that is, the amount of fuel stored in the second tank is reduced before the amount of fuel stored in the first tank.

SUMMARY OF THE INVENTION

A fuel system of the present invention includes: a first tank and a second tank that respectively store fuel; a fuel supply pump that supplies the fuel in the first tank out of the first tank to a fuel consuming section; and a transfer pump that transfers the fuel in the second tank into the first tank.

The present invention also includes a fuel passage having an inlet in communication with an inner portion of the first tank, and an outlet in communication with an inner portion of the second tank, wherein the fuel in the first tank is caused to overflow into the second tank through the fuel passage.

Here, in the fuel system of the present invention, when an amount of the fuel in the first tank exceeds a predetermined storage amount, the fuel in the first tank overflows into the second tank through the fuel passage, and the fuel stops overflowing into the second tank from the first tank subsequently to termination of the transfer of the fuel from the second tank to the first tank since the fuel in the second tank is reduced.

As a form of overflow in the present invention, the fuel is enabled to overflow by gravity.

In the fuel system of the present invention, the transfer pump is operated at a capacity where the amount of transferred fuel exceeds the amount of fuel consumption so as to cause the fuel to overflow. Accordingly, the first tank is filled with a larger amount of fuel than the reduced amount consumed by the fuel consuming section. Thus, the first tank maintains a full storage amount, and an amount exceeding the full storage amount overflows into the second tank through the fuel passage.

When more fuel is consumed until the fuel in the second tank is used up, or the fuel cannot be pumped up by the transfer pump, the fuel transfer is terminated. Subsequently, the fuel stops overflowing. After that, the fuel in the first tank is consumed.

As described above, in the present invention, the fuel is transferred from the second tank to the first tank, and the fuel in the first tank is supplied to the fuel consuming section. In the configuration, the fuel amount in the second tank can be reduced first. Moreover, if an amount of the fuel in the first tank exceeds a predetermined storage amount, the fuel in the first tank overflows into the second tank through the fuel passage.

Although the same effect may be achieved by another configuration, an electromagnetic valve, an electric pump, a control unit, or the like are required. It is necessary to construct a complicated control system electrically connected to the electromagnetic valve and the electric pump. Accordingly, the weight and the cost are increased due to a large number of required equipments.

In contrast, in the fuel system of the present invention, the fuel amounts in the respective tanks are autonomously determined based on the amount of fuel consumption, the amount of transfer, and the amount of overflow. Thus, the control is not required, and the fuel amount in the second tank can be reduced before the fuel amount in the first tank by the simple configuration based on the simple overflow mechanism.

Furthermore, the overflow through the fuel passage also improves the fueling efficiency into the tanks.

For example, the fuel is supplied at a predetermined fueling rate from filler ports respectively provided in the first tank and the second tank. Even after the first tank is fully filled before the second tank, the fuel continues to be supplied into the first tank, thereby causing the fuel to overflow into the second tank from the first tank. Accordingly, the fuel flowing through the fuel passage as well as the fuel supplied from the filler port flows into the second tank. The fueling into the second tank is thereby quickly performed, and the fueling can be completed within a short length of time.

The fuel system of the present invention may be mounted on an aircraft, the first tank may be located outside the second tank on a right or left side of the second tank, and the fuel passage preferably has a down grade from the inlet toward the outlet based on a dihedral angle of the main wing.

In the fuel system provided over the main wings and a fuselage of the aircraft, the fuel passage that causes the fuel to overflow by gravity can be easily provided according to the down grade based on the dihedral angle.

In the fuel system of the present invention, it is preferable the transfer pump does not require control based on the respective fuel amounts in the first tank and the second tank.

Particularly, a jet pump is preferably employed as the transfer pump.

By operating the transfer pump from the start to the end of transfer, it is possible to accomplish the purpose of consuming the fuel in the second tank first by the action of overflow without controlling the fuel transfer amount.

When the jet pump is used as the transfer pump, the jet pump is inexpensive, and there is a lower possibility of failure since the jet pump has no movable section. The reliability can be thereby also improved. Moreover, the fuel economy can be also improved as compared to a case in which the electric pump is used.

In the fuel system of the present invention, a vent that leads to outside air may be provided in at least one of the first tank and the second tank, and one of the first tank and the second tank preferably communicates with the vent provided in the other of the tanks through the fuel passage.

The fuel passage also functions as a vent passage when the fuel is not flowing therethrough. Therefore, one of the tanks communicates with the vent provided in the other of the tanks through the fuel passage. Accordingly, the redundancy of the ventilation system can be ensured.

In the fuel system of the present invention, the aircraft may include a skin and a plurality of stringers that reinforce the skin, and the fuel passage preferably is formed inside the skin, the adjacent stringers, and a cover member that covers a gap between the adjacent stringers.

The fuel passage of the present invention does not require any function other than that for simply causing the fuel to flow, and it is not necessary to provide a fuel valve or the like therein. Therefore, not a normal pipe, but the existing stringers can be used as the fuel passage.

When the aircraft is parked on the ground, or is cruising in the sky, gas accumulation in the first tank is located on the main wing tip side within the first tank based on the dihedral angle. In this state, the fuel can be caused to overflow into the second tank through the fuel passage by gravity while maintaining the full storage amount in the first tank. This is intended overflow in the present invention.

Meanwhile, when a position of the aircraft, in which the main wing has the dihedral angle and a sweepback angle, is within a predetermined range of a climb angle, the gas accumulation moves from the main wing tip side to another place within the first tank, so that the inlet of the fuel passage is immersed in the fuel. Then, the fuel overflows toward the outlet that is located below the inlet. This is unintended overflow not supposed to occur in a state in which the aircraft is in a horizontal position on the ground or in the sky, or is out of the predetermined climb angle range.

To prevent the unintended overflow, in the aircraft in which the main wing has the dihedral angle and a sweepback angle, the outlet of the fuel passage is preferably located above a fluid surface of the fuel in the first tank when a position of the aircraft is within a predetermined range of a climb angle.

When the outlet of the fuel passage is always opened within the second tank at a higher position than the fluid surface in the first tank within the predetermined climb angle range in which there is a possibility of the occurrence of the unintended overflow, the unintended overflow does not occur even when the inlet of the fuel passage is immersed in the fuel.

Influences on the control of the gravity center of the airframe can be avoided by preventing the unintended overflow. Also, since the fuel amounts remaining in the respective tanks are changed as expected based on the fuel consumption, a pilot is not unnecessarily confused about the fuel amounts in the tanks.

To prevent the unintended overflow, the fuel passage preferably includes a fluid surface upper portion that is located above a fluid surface of the fuel in the first tank when a position of the aircraft is within a predetermined range of a climb angle in the vicinity of the outlet of the fuel passage in addition to the configuration in which the outlet of the fuel passage is opened within the second tank at a higher position than the fluid surface of the fuel in the first tank. A vent hole is formed in the fluid surface upper portion so as to avoid a siphon phenomenon.

In this case, the outlet of the fuel passage can be arranged below the fluid surface upper portion, and closer to the fluid surface of the fuel in the second tank. Accordingly, a height difference between the outlet and the fluid surface of the fuel in the second tank can be reduced, and it is possible thereby to avoid the occurrence of static electricity with the fuel flowing out of the outlet and striking against the fluid surface.

The fuel system according to the present invention may be such that the main wing has the dihedral angle and a sweepback angle, the fuel passage includes a fluid surface upper portion that is located above a fluid surface of the fuel in the first tank when a position of the aircraft is within a predetermined range of a climb angle in the vicinity of the outlet, a vent hole is formed in the fluid surface upper portion, and the outlet of the fuel passage is in the vicinity of a fluid surface of the fuel in the second tank.

The fuel system according to the present invention may be also such that the main wing has the dihedral angle and a sweepback angle, the fuel passage includes a fluid surface upper portion that is located above a fluid surface of the fuel in the first tank when a position of the aircraft is within a predetermined range of a climb angle in the vicinity of the outlet, a vent hole is formed in the fluid surface upper portion, and the fuel passage includes a plurality of outlets.

In the present invention, the fuel system may include a plurality of second tanks, wherein the second tanks are preferably connected in parallel with the first tank.

In the present invention, the fuel system may include: a plurality of second tanks; a pump that transfers the fuel in one of the second tanks into other one of the second tanks;

and a fuel passage having an inlet in communication with the inner portion of the one of the second tanks, and an outlet in communication with an inner portion of the other one of the second tanks, wherein: the fuel in the one of the second tanks is preferably caused to overflow into the other one of the second tanks through the fuel passage; and the second tanks are preferably connected in series with the first tank.

The fuel system described above may be favorably mounted on an aircraft.

The fuel system of the present invention can achieve, with simple and a small number of members, the configuration in which the fuel amount stored in the second tank is reduced before the fuel amount stored in the first tank.

DETAILED DESCRIPTION OF THE PREFERRED EMBODIMENTS

Embodiment

In the following, an embodiment according to the present invention will be described with reference to the accompanying drawings.

Figure 1:
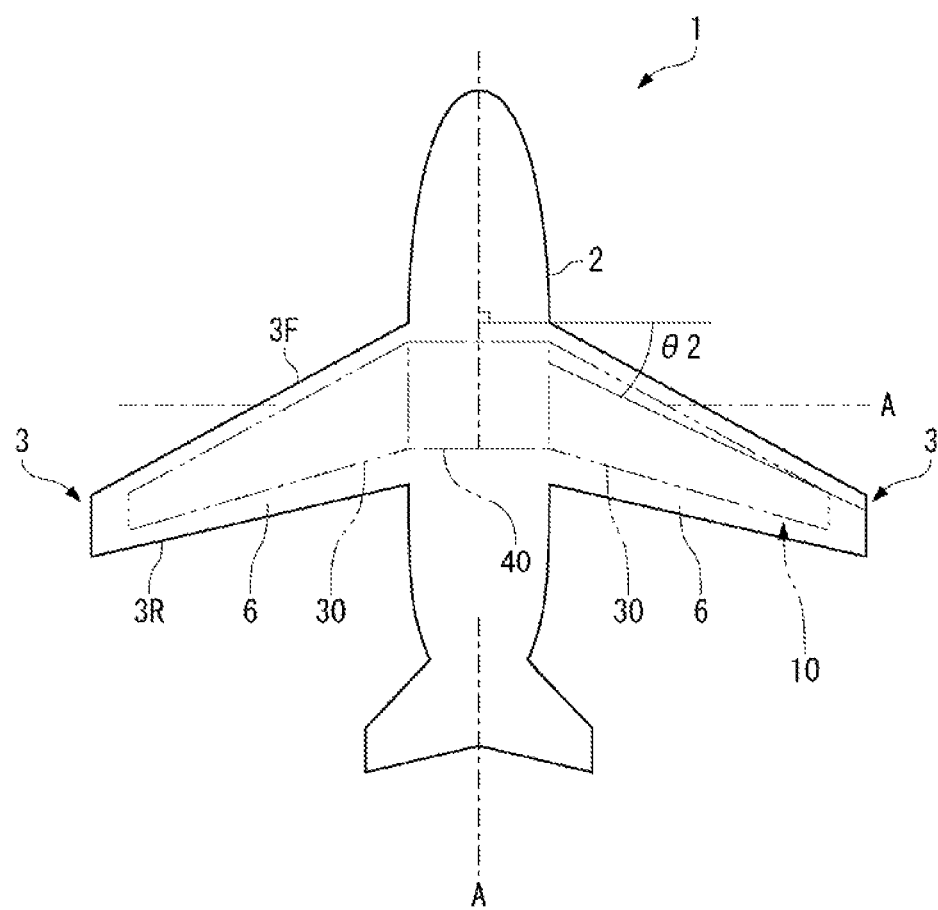
FIG. 1 is a plan view schematically illustrating an aircraft where a fuel system according to an embodiment of the present invention is mounted.

As shown in FIG. 1, an aircraft 1 includes a fuselage 2, and a pair of main wings 3 and 3 that extend to the left and the right from the fuselage 2.

Figure 2A:
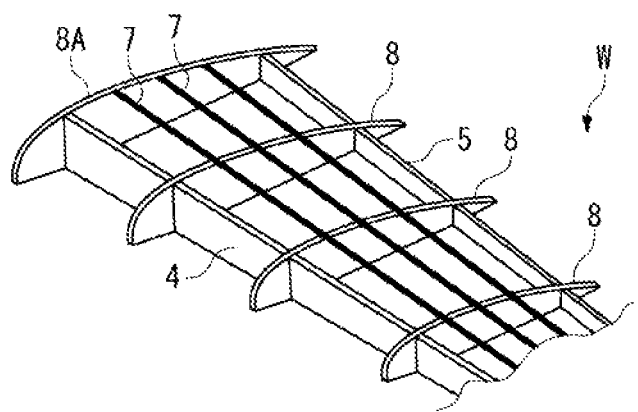
FIGS. 2A and 2B are perspective views schematically illustrating members constituting a main wing.

Each of the main wings 3 includes a spar 4 (FIG. 2A) that extends along a leading edge 3F of the main wing 3, a spar 5 (FIG. 2A) that extends along a trailing edge 3R of the main wing 3, and a skin 6 that forms front and back outer surfaces of the main wing 3, and is assembled together with the spars 4 and 5 in a box-like shape.

Figure 2B:
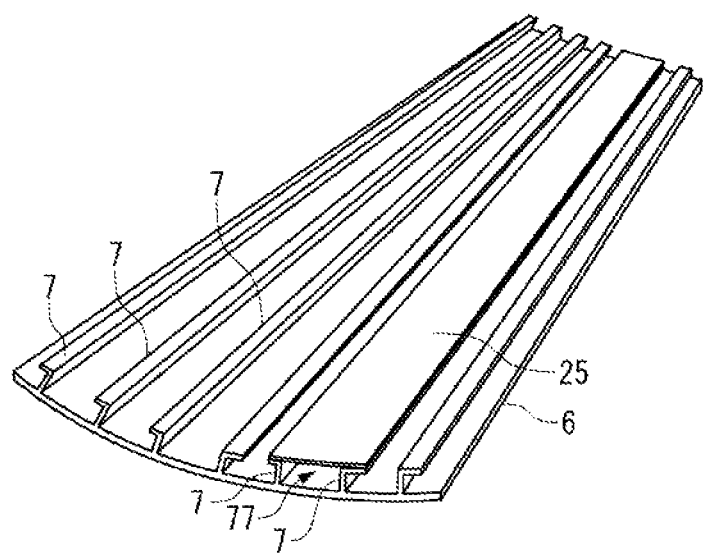

The skin 6 is reinforced by a plurality of stringers 7 shown in FIG. 2B. A plurality of ribs 8 are also provided between the front skin 6 and the back skin 6 of the main wing 3 in a direction crossing the stringers 7. The ribs 8 connect the spars 4 and 5, and support the skins 6 and 6. Cutouts 81 (FIG. 9) are formed at the upper and lower ends of each of the ribs 8 so as to accommodate the stringers 7 that are provided projecting on the skins 6.

The spars 4 and 5, the skins 6 and 6, the plurality of stringers 7, and the plurality of ribs 8 constitute a wing box W. The wing box W extends along substantially the entire length of the main wings 3 and 3, and the fuselage 2.

An inner portion of the wing box W is used as a fuel tank for storing a fuel (fuel oil). The wing box W includes outer tanks 30 and 30 (a first tank) that are respectively located in the main wings 3 and 3, and an inner tank 40 (a second tank) that is located in the fuselage 2. The outer tanks 30 and 30 are located outside the inner tank 40, on right and left sides of the inner tank 40, respectively. The outer tanks 30 and 30, and the inner tank 40 are separated from each other, and thereby separately store fuel.

Although the wing box W includes other tanks such as a surge tank, these tanks are not shown in the drawings, and the description thereof is omitted.

The ribs 8 exist within each of the outer tanks 30 and the inner tank 40. Since the fuel can pass through the cutouts 81 of the ribs 8, an inner portion of each of the tanks 30 and 40 is a continuous storage space.

The inner tank 40 may be provided over the fuselage 2 and root portions of the main wings 3 and 3.

A fuel system 10 including the outer tanks 30 and 30 and the inner tank 40 is mounted on the aircraft 1.

The configuration of the fuel system 10 is described with reference to FIGS. 3 and 4. Since the aircraft 1 is configured symmetrically with respect to a longitudinal axis A (FIG. 1) extending through the fuselage 2, the left-side outer tank 30, and the left half of the inner tank 40 are shown therein and described below. The right-side outer tank 30 is configured similarly to the left-side outer tank 30.

The outer tank 30 is a main tank of the aircraft 1 that is preferentially fueled before the inner tank 40.

The outer tank 30 is provided with a fuel supply pump 31 that supplies fuel toward an engine (a fuel consuming unit) (not shown) of the aircraft 1, two vents 32 and 32 that lead to the outside air, and a filler port 34 that is used to supply fuel into the outer tank 30.

The fuel supply pump 31 is connected to a pipe (not shown) that is connected to an outlet from which the fuel in the outer tank 30 flows out. The fuel supply pump 31 pumps the fuel toward the engine through the pipe.

The vents 32 and 32 are respectively connected to vent passages (not shown) using the stringers 7 and 7, and constitute one ends of the respective vent passages. The other ends of the vent passages open in the outer tank 30.

The vents 32 and 32 of the outer tank 30, and a vent 42 of the inner tank 40 described below achieve a balance between the inner pressure of each tank and the outside pressure so as to prevent application of an excessive pressure to the tanks due to a difference between the inner pressure of each tank and the outside pressure. The inner portions of the tanks are also prevented from assuming a negative pressure only by introducing the outside air into the tanks through the vents by a consumed amount of fuel in the tank, thereby maintaining the fuel supply.

The inner tank 40 is a sub tank that may be in an empty state in a case of short-distance flight. The inner tank 40 is provided with the vent 42 that leads to the outside air, and a filler port 44 that is used to supply fuel into the inner tank 40.

The vent 42 is actually connected to a vent passage (not shown) using the stringers 7 and 7, and constitutes one end of the vent passage. The other end of vent passage opens in the inner tank 40.

The fuel in the inner tank 40 is transferred to the outer tank 30 through a transfer pipe 27 that connects the inner tank 40 and the outer tank 30. A transfer pump 23 that transfers the fuel from the inner tank 40 to the outer tank 30 is connected to the transfer pipe 27. The transfer pump 23 and the above fuel supply pump 31 are provided together with valves (not shown), if necessary.

Various pumps including an electric pump may be used as the transfer pump 23. Particularly, a fluid pump (a jet pump) is preferably used.

The transfer pipe 27 and the transfer pump 23 are also provided on the right side of the inner tank 40. The fuel in the inner tank 40 is transferred to the right and left outer tanks 30 and 30 by the transfer pumps 23 on the right and left side and then supplied to the engine respectively by the fuel supply pumps 31 of the right and left outer tanks 30 and 30.

Figure 3:
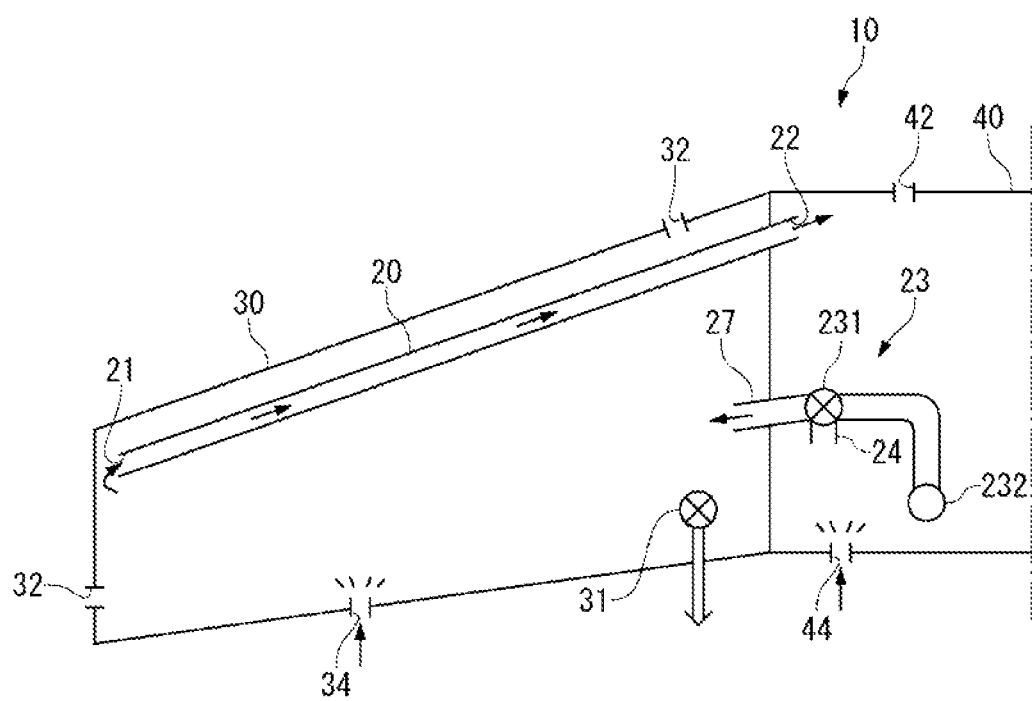
FIG. 3 is a plan view schematically illustrating a fuel passage, pumps, vents or the like provided in an inner tank and an outer tank.

The transfer pump 23 of the present embodiment includes a jet pump 231 having a suction pipe 24, and a pump 232 as shown in FIG. 3. Although the suction pipe 24 extends perpendicular to the paper surface of FIG. 3 toward the back side of the paper surface, the suction pipe 24 shown in FIG. 3 is in a plan view for convenience of illustration.

The fuel having a predetermined rate pumped by the pump 232 passes through the jet pump 231. The jet pump 231 thereby sucks the fuel in the inner tank 40 from the suction pipe 24, and discharges the fuel into the outer tank 30 through the transfer pipe 27.

As is well known, the jet pump 231 is a fluid pump that sucks an outside fluid with a high-pressure fluid accelerated to be decompressed, and thereafter decelerates and increases the pressure of the fluid by a diffuser.

Figure 4:
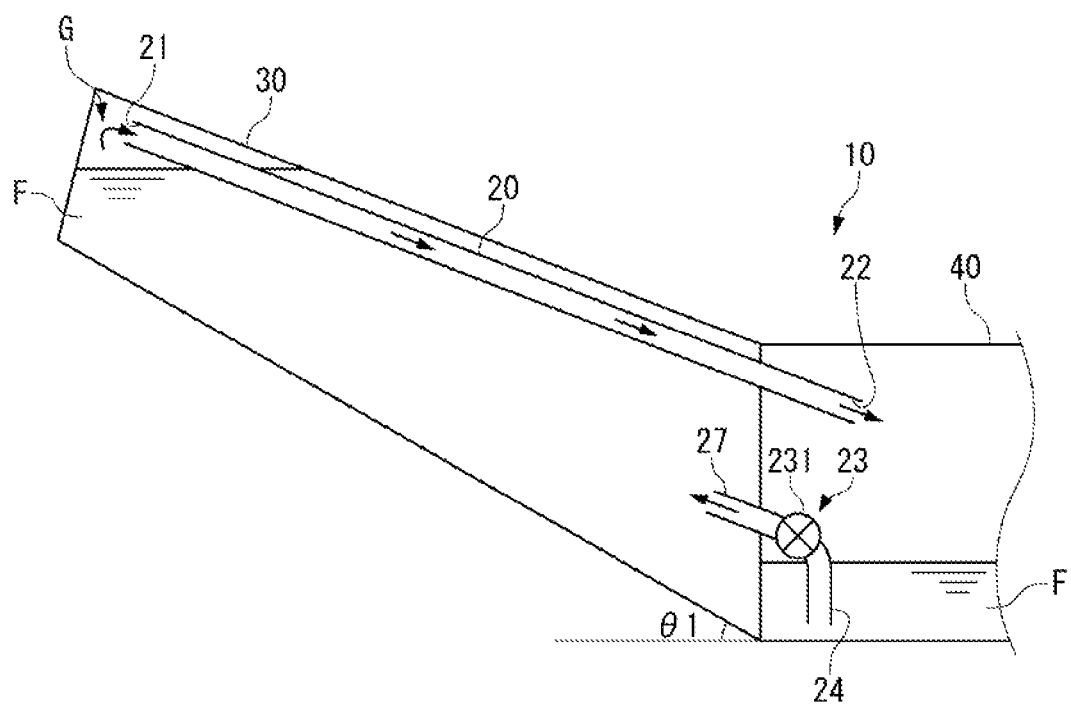
FIG. 4 is a sectional view of the inner tank and the outer tank schematically shown from the front side of an airframe.

The lower end of the suction pipe 24 is located in a lower portion within the inner tank 40 when the aircraft 1 is in a position normally assumed during a flight (see FIG. 4).

The outlet within the outer tank 30, to which the fuel supply pump 31 is connected via the pipe, is also located in a lower portion within the outer tank 30 when the aircraft 1 is in a position normally assumed during a flight.

During the flight of the aircraft 1, the fuel in the outer tank 30 is supplied to the engine by the fuel supply pump 31 while the fuel in the inner tank 40 is being transferred into the outer tank 30 by the transfer pump 23. The fuel in the inner tank 40 is transferred into the outer tank 30 by the transfer pump 23 until the fluid surface of the fuel in the inner tank 40 is lowered and the fuel cannot be pumped out through the suction pipe 24.

The fuel in the outer tank 30 provided in the main wing 3 is supported directly below by the lift that the main wing 3 receives against the gravity of the fuel.

Fuel in the inner tank 40 provided in the fuselage 2 is supported at a distance away from the inner tank 40 by the lift that the main wing 3 receives, thereby forming a moment in the main wing 3 and fuselage 2. Therefore, a strength enough to support the fuel in the inner tank 40 is required over the fuselage 2 and the main wing 3. Increasing the strength leads to an increase in the weight of an airframe structure, resulting in a deterioration of fuel economy.

Therefore, in the present embodiment, as fuel is supplied to the engine from the outer tank 30, fuel is transferred from the inner tank 40 to the outer tank 30 by the transfer pump 23 so as to maintain fuel in the outer tank 30 and reduce the fuel amount in the inner tank 40 before the fuel amount in the outer tank 30 is reduced.

The fuel system 10 has a main feature in which the system of transferring the fuel from the inner tank 40 to the outer tank 30 is employed as described above, and a fuel passage 20 is provided that permits fuel in the outer tank 30 to overflow into the inner tank 40.

The fuel passage 20 includes an inlet 21 that communicates with the inner portion of the outer tank 30, and an outlet 22 that communicates with the inner portion of the inner tank 40 as shown in FIG. 3.

The inlet 21 opens in the outer tank 30 on the tip side of the main wing 3. The fuel passage 20 extends substantially along the leading edge 3F from the inlet 21 to the outlet 22.

Here, the main wing 3 has a dihedral angle $\theta 1$ with respect to the fuselage 2 as shown in FIG. 4. The fuel passage 20 has a down grade continuous from the inlet 21 to the outlet 22 below the inlet 21 based on the dihedral angle $\theta 1$. When the inlet 21 of the fuel passage 20 is immersed in the fuel (denoted by F) in the outer tank 30, the fuel flows into the fuel passage 20 from the inlet 21, flows toward the outlet 22 along the down grade, and flows down into the inner tank 40 from the outlet 22.

Therefore, the fuel amount in the outer tank 30 when the fuel level is just below the inlet 21 is considered a full storage amount of the outer tank 30 because any fuel added to the outer tank 30 beyond the full storage amount will overflow into the inlet 21 and through the fuel passage 20 into the inner tank 40.

The fuel passage 20 is formed inside the skin 6, the adjacent stringers 7 and 7, and a cover member 25 that covers a gap between the stringers 7 and 7 as shown in FIG. 2B.

The cover member 25 is a rectangular plate having a width corresponding to the gap between the adjacent stringers 7 and 7. The cover member 25 is fixed to the distal ends of the stringers 7 and 7 projecting from a back surface of the skin 6 by any method such as welding, pressure welding, and adhesion. The stringers 7 and 7 may have any sectional shape.

At least one of the cutouts 81 of each of the ribs 8 (FIG. 9) has a size large enough to pass the fuel passage 20 therethrough. The cover member 25 penetrates the rib 8 through the cutout 81, and extends from the inlet 21 to the outlet 22.

A passage 77 between the stringers 7 and 7 is separated from the storage spaces within the tanks 30 and 40 by the cover member 25 over the length from the inlet 21 to the outlet 22. The passage 77 is used as the fuel passage 20.

Next, the operation of the present embodiment including the fuel passage 20 is described in view of fuel consumption, fueling, and ventilation redundancy.

(Fuel Consumption)

Figure 5A:
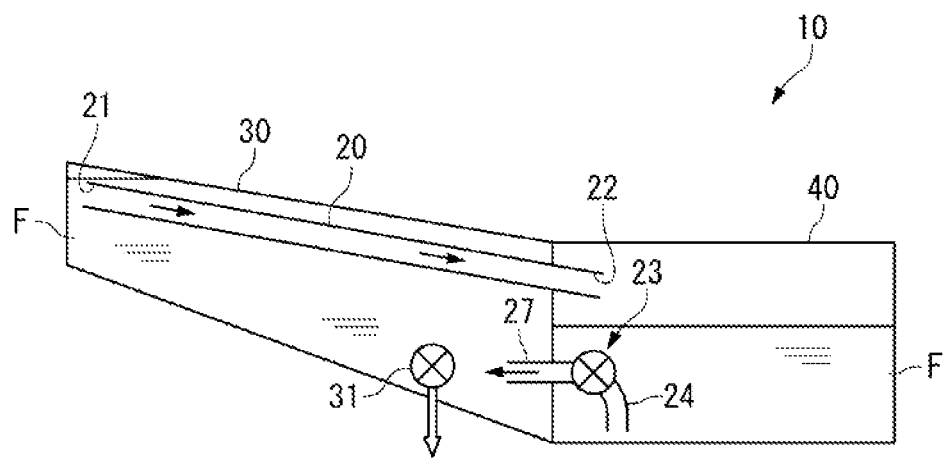
FIGS. 5A and 5B are views illustrating one example of fuel consumption.
Figure 5B:
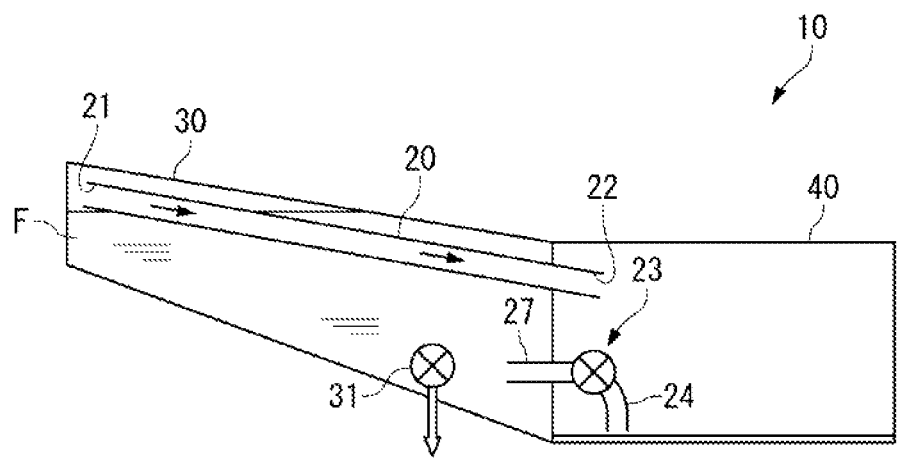

One example of the fuel consumption is described by illustrating the fuel amounts in the respective tanks in FIGS. 5A and 5B.

A predetermined amount of fuel according to a flight distance is stored in the outer tank 30 and the inner tank 40 by fueling before flight.

After an elapse of a predetermined time after flight is started, the fuel remains in both the outer tank 30 and the inner tank 40 as shown in FIG. 5A.

At this point, unless the amount of fuel consumed for driving the engine is too much, the transfer pump 23 is continuously operated at a capacity where the amount of fuel transferred by the transfer pump 23 exceeds the amount of fuel consumption. Accordingly, the outer tank 30 is filled with a larger amount of fuel than the reduced amount consumed for driving the engine. Thus, the outer tank 30 maintains the full storage amount, and an amount exceeding the full storage amount overflows into the inner tank 40 through the fuel passage 20 by gravity. While the inlet 21 is immersed in the fuel, the fuel continues to overflow.

When more fuel is consumed during the flight, the fuel amount in the inner tank 40 falls below the lower end of the suction pipe 24 as shown in FIG. 5B, and the fuel cannot be pumped up by the transfer pump 23. Thus, the fuel transfer is terminated at this point of time.

Subsequently, when the inlet 21 of the fuel passage 20 is no longer immersed in the fuel, the fuel stops overflowing through the fuel passage 20. After that, the fuel does not pass between the outer tank 30 and the inner tank 40. The fuel in the outer tank 30 is consumed until the flight is finished.

(Fueling)

The overflow through the fuel passage 20 is also utilized during the fueling into the tank.

As shown in FIG. 3, the fuel is supplied from the filler port 34 into the outer tank 30, and from the filler port 44 into the inner tank 40. Even after the outer tank 30 is fully filled, the fuel continues to be supplied into the outer tank 30 from the filler port 34, thereby causing the fuel to overflow into the inner tank 40 through the fuel passage 20. Accordingly, the fuel supplied from the filler port 44, and the fuel flowing through the fuel passage 20 flow into the inner tank 40. The fueling into the inner tank 40 is thereby completed within a short length of time.

(Ventilation Redundancy)

The ventilation redundancy inside and outside the tanks is described with reference to FIG. 3.

When the fuel is not flowing through the fuel passage 20, a gaseous body in the tanks 30 and 40 can pass between the tanks 30 and 40 through the fuel passage 20. Thus, the fuel passage 20 is also used as a vent passage. At this point, each of the tanks 30 and 40 communicates with the vent of the other tank through the fuel passage 20.

Accordingly, the outer tank 30 can be ventilated with the outside using a first ventilation system in communication with the vent 42 of the inner tank 40 through the fuel passage 20. In addition, the outer tank 30 can be ventilated with the outside using a second ventilation system that includes the vents 32 and 32 of the outer tank 30.

The inner tank 40 can be ventilated with the outside using a first ventilation system that is in communication with the vent 32 of the outer tank 30 through the fuel passage 20. In addition, the inner tank 40 can be ventilated with the outside using a second ventilation system that with includes the vent 42 of the inner tank 40.

Therefore, for each of the inner and outer tanks 30, 40, even when one of its associated first and second ventilation systems is clogged due to some reason, ventilation of the tank is ensured by the other ventilation system.

For example, even when the ventilation system including the vent 42 of the inner tank 40 is clogged due to some reason, ventilation with the outside is performed by the ventilation system in communication with the vent 32 of the outer tank 30 through the fuel passage 20.

Even when both the vents 32 and 32 of the outer tank 30 are clogged, ventilation with the outside is performed by the ventilation system in communication with the vent 42 of the inner tank 40 through the fuel passage 20.

As described above, the ventilation system through the fuel passage 20 is added separately from the ventilation systems respectively provided in the outer tank 30 and the inner tank 40, so that the redundancy of the ventilation systems is ensured.

The effects of the fuel system 10 of the present embodiment are described based on the above description.

First, the effect in view of the fuel consumption is described.

In the fuel system 10 of the present embodiment, the fuel is transferred from the inner tank 40 to the outer tank 30, and the fuel in the outer tank 30 is supplied to the engine as described above. In the configuration, the fuel amount in the inner tank 40 can be reduced first by employing the configuration in which the fuel is caused to overflow into the inner tank 40 from the outer tank 30 by gravity.

Figure 14A:
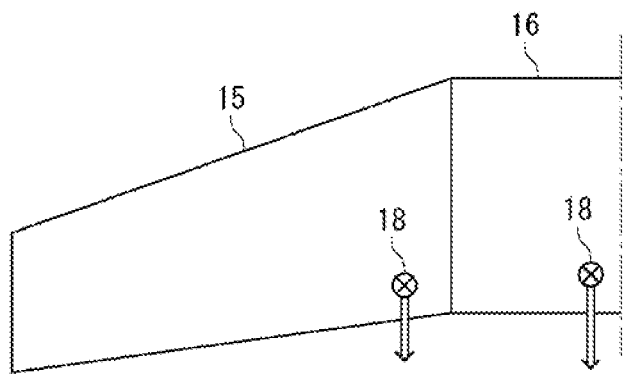
FIGS. 14A and 14B are views illustrating a conventional fuel system.
Figure 14B:
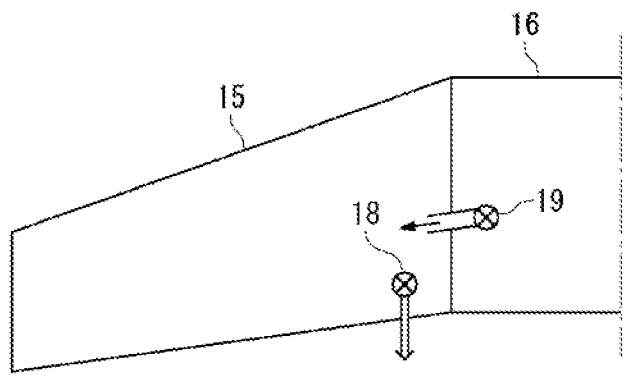

There is a method for achieving the same effect by, for example, controlling the amount of transfer by the transfer pump 23 based on the fuel amount in the outer tank 30 (referred to as the former case below). The same effect may be also achieved by providing a fuel supply pump 18 in each of the outer tank 30 and the inner tank 40, and controlling the amounts of pumping by the respective fuel supply pumps based on the fuel amounts in the respective tanks 30 and 40 in a similar manner to a configuration shown in FIG. 14A (referred to as the latter case below).

However, in the former case, an electromagnetic valve, an electric pump, a control unit, an electric motor, and a display or the like are required as the transfer pump 23 and its related equipment. It is necessary to construct a complicated control system electrically connected to the electromagnetic valve and the electric pump. A sensor for detecting the fuel amount in the tank is also required. Accordingly, the weight and the cost are increased due to a large number of required equipments, and a development period for the control unit is required.

In the latter case, an electromagnetic valve, an electric pump, a control unit, an electric motor, and a display or the like are required as the fuel supply pump 18 and its related equipment. It is necessary to construct a complicated control system electrically connected to the electromagnetic valve and the electric pump. A sensor for detecting the fuel amount in the tank is also required. Moreover, a dedicated fuel supply pump is required for each tank. Accordingly, the weight and the cost are increased due to a large number of required equipments, and a development period for the control unit is required in a similar manner to the former case. Particularly, the weight and the cost are dramatically increased by providing a large pump for pumping the fuel toward the engine in each of the tanks.

In contrast to the above configuration, in the present embodiment, the control is not required, and it is only necessary to cause the fuel to overflow into the tank as the origin of transfer while transferring the fuel between the tanks by the transfer pump 23. Thus, the mechanism can be simplified. The fuel system 10 of the present embodiment requires only the transfer pump 23 and the fuel passage 20 that permits the fuel to overflow in addition to the tanks 30 and 40. By using the fuel system 10, the fuel amounts in the respective tanks 30 and 40 are autonomously determined based on the amount of fuel consumption, the amount of transfer, and the amount of overflow. Thus, the fuel amount in the inner tank 40 can be reduced before that in the outer tank 30 by the simple configuration.

Therefore, the weight can be reduced to improve the fuel economy, and the manufacturing cost can be also suppressed. Since there is a lower possibility of failure because of the simple configuration, the reliability can be also improved.

In the fuel system 10 of the present embodiment, the jet pump can be employed as the transfer pump 23. By operating the jet pump at a predetermined capacity from the start to the end of transfer, it is possible to accomplish the purpose of consuming the fuel in the inner tank 40 first without controlling the fuel transfer amount by the action of overflow.

When the jet pump is used as the transfer pump 23, there is a lower possibility of failure since the jet pump has no movable section. The reliability can be thereby also improved. Moreover, the fuel economy can be also improved as compared to a case in which the electric pump is used.

Figure 6:
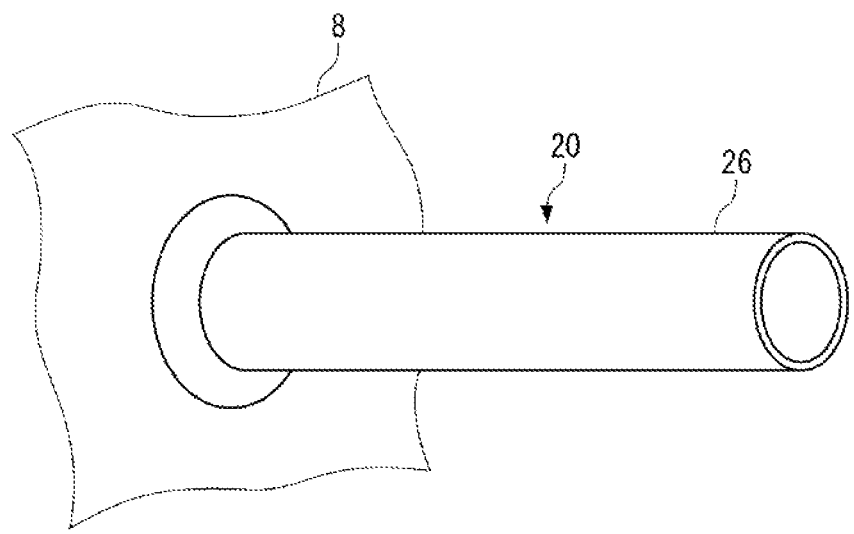
FIG. 6 is a view illustrating an example in which the fuel passage is composed of a pipe.

Although the fuel passage 20 may be of course composed of a tubular pipe 26 as shown in FIG. 6, it is preferable to cover the gap between the stringers 7 and 7 with the cover member 25, and use the passage 77 formed between the stringers 7 and 7 as the fuel passage 20 as in the present embodiment.

Here, the fuel system 10 of the present embodiment only needs to be provided with the fuel passage 20, through which the fuel flowing from the inlet 21 flows toward the outlet 22, and it is not necessary to provide an equipment such as a fuel valve therein.

As described above, it is possible to employ the configuration in which the passage 77 between the stringers 7 and 7 is used as the fuel passage 20 based on the advantage that the fuel passage 20 does not require any function other than that for simply causing the fuel to flow. This point is described below.

For example, when a fuel valve or the like is provided, the pipe 26 having a circular shape in section as shown in FIG. 6 is used so as to connect pipes with the fuel valve therebetween with no leakage. To arrange the pipe 26 within the wing box W, it is necessary to form a hole for passing the pipe 26 through the rib 8. It is also necessary to provide a reinforcement around the hole, resulting in a weight increase. In a case of a small-sized aircraft, the structure itself is small, and the area of the hole formed in the rib 8 is also limited. Thus, the pipe 26 may not be passed through the rib 8 in some cases.

On the other hand, when the fuel valve or the like is not provided, the fuel passage may have any sectional shape. Thus, the form utilizing the existing stringers 7 and 7 can be employed. In this case, it is not necessary to form a hole in the rib 8, and the weight increase is also suppressed. Since the existing structure is utilized, it is also not necessary to ensure a space required for providing the fuel passage 20, which is particularly advantageous to a middle-sized or small-sized aircraft having a limited installation space for accessories.

Next, the effect in view of the fueling is described.

In a regularly-scheduled aircraft, it is important to shorten a turn around time that is a time required from landing to takeoff. A fueling time accounts for a large proportion of the turn around time. Thus, it is desirable to shorten the fueling time as much as possible.

A fueling rate from the filler port to the tank is limited to a rate at which electrostatic charge by a fuel flow can be suppressed so as to ensure the safety. The fueling time can be reduced by increasing the number of filler ports or the opening diameter of the filler port. However, the weight is thereby increased, and the installation space is also limited. Thus, if possible, it is preferable not to increase the number of filler ports or the opening diameter of the filler port.

The fueling can be finished within a short length of time by using the overflow through the fuel passage 20 as described above.

For example, the fueling into the tanks 30 and 40 is performed at 1 m/s respectively from the filler ports 34 and 44. The fuel continues to be supplied into the outer tank 30 from the filler port 34 even after the outer tank 30 is fully filled. The fuel is thereby caused to overflow into the inner tank 40 through the fuel passage 20. The fuel amount in the inner tank 40 is reduced before the fuel amount in the outer tank 30. Accordingly, when a larger amount of fuel remains in the outer tank 30 than in the inner tank 40, the overflow occurs at a relatively early stage.

When the overflow occurs, the fuel is stored in the inner tank 40 at a fueling rate of 2 m/s by the fuel supplied from the filler port 44 and the fuel flowing through the fuel passage 20. As a result, a predetermined amount of fuel can be supplied to each of the outer tank 30 and the inner tank 40 within a short length of time.

The similar effect can be also achieved by providing a pump for transferring the fuel from the outer tank 30 to the inner tank 40. However, the present embodiment has a value in shortening the fueling time in a simple and highly-reliable method by use of the overflow.

Next, the effect in view of the ventilation is described.

The fuel passage 20 functions as the vent passage when the fuel is not flowing therethrough. Therefore, as described above, one of the tanks communicates with the vent provided in the other of the tanks through the fuel passage 20, so that the redundancy of the ventilation systems can be ensured.

Therefore, it is possible to reliably prevent application of an excessive pressure to the tank due to a difference in pressure with the outside air when the ventilation system is clogged. It is particularly advantageous to an integral structure in which the wing box W is directly used as the fuel tank as in the present embodiment that excessive pressurization leading to destruction of the structure can be avoided.

While a plurality of float valves are provided in each vent so as to ensure the redundancy, the number of float valves can be also reduced by using the fuel passage 20 as the vent passage. The weight can be thereby also decreased.

The number of the float valves, and the number of the vents may be appropriately set according to the level of required redundancy. When the vent is provided in at least one tank 30 (or 40) out of the two tanks 30 and 40 in communication with each other through the fuel passage 20, the ventilation system with the outside is ensured even when the other tank 40 (or 30) is provided with no vent.

In the following, the overflow when the position of the aircraft 1 is changed is studied.

When the aircraft 1 is parked on the ground, or is cruising in the sky, gas accumulation G in the outer tank 30 is located on the wing tip side within the outer tank 30 based on the dihedral angle $\theta 1$ as shown in FIG. 4. The gas accumulation G leads to the vent 32 (FIG. 3) on the wing tip side of the outer tank 30.

In this state, the fuel can be caused to overflow into the inner tank 40 through the fuel passage 20 while maintaining the full storage amount in the outer tank 30. This is intended overflow.

Meanwhile, when the aircraft 1, in which the main wing 3 has the dihedral angle $\theta 1$ and a sweepback angle $\theta 2$, is in a certain level of nose-up position, and is within a predetermined range of a climb angle, the gas accumulation G moves from the wing tip side to another place within the outer tank 30, so that the inlet 21 of the fuel passage 20 is immersed in the fuel. Then, the fuel overflows toward the outlet 22 that is located below the inlet 21 by gravity. This is unintended overflow not supposed to occur in a state in which the aircraft 1 is substantially in a horizontal position on the ground or in the sky.

Figure 7A:
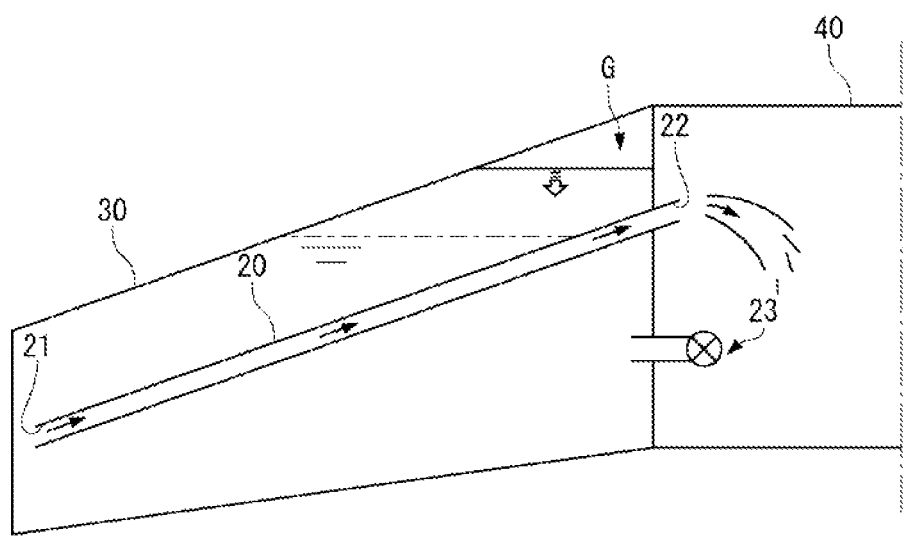
FIGS. 7A and 7B are views for explaining unintended overflow.
Figure 7B:
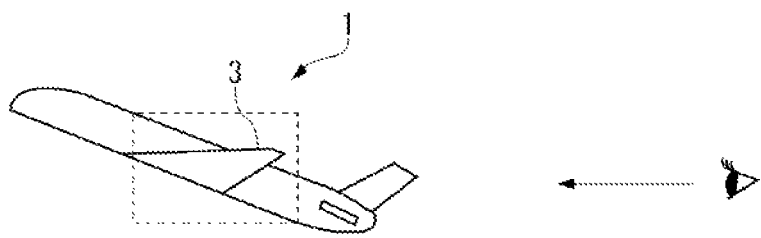

FIG. 7A shows a state in which the unintended overflow occurs. FIG. 7A shows the fuel system 10 when the aircraft 1 in a nose-up state is viewed from the rear in a forward direction as shown in FIG. 7B.

The unintended overflow occurs even when the fuel amount in the outer tank 30 is not the full storage amount. While the intended overflow is performed by causing only an extra amount of fuel exceeding the full storage amount to overflow, the unintended overflow is performed by moving the fuel from the outer tank 30 to the inner tank 40 even when the fuel amount in the outer tank 30 is equal to or less than the full storage amount.

Once the unintended overflow occurs, the overflow is continued until the inlet 21 or the outlet 22 of the fuel passage 20 is no longer under the fluid surface of the fuel in the outer tank 30 based on the principle of siphon (see the fluid surface indicated by an alternate long and short dash line).

In the aircraft 1 in which the main wing 3 has the dihedral angle θ1 and the sweepback angle θ2, it is necessary to prevent the unintended overflow as described above.

Figure 8A:
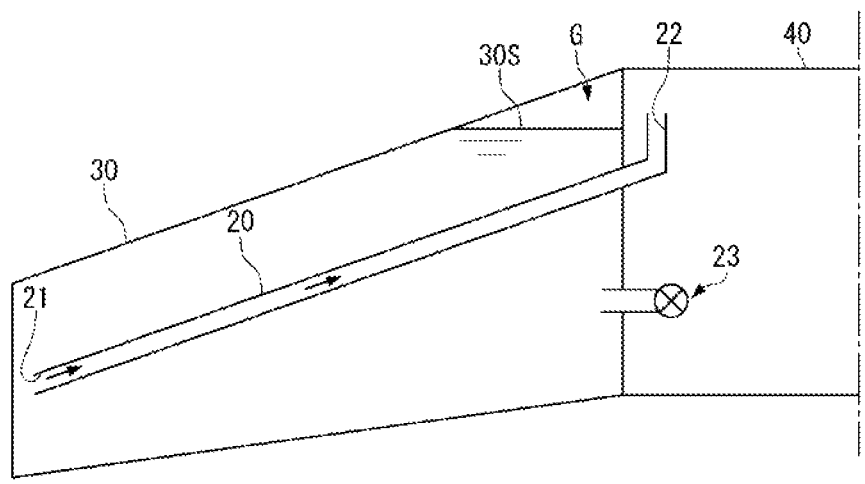
FIG. 8A is a schematic view illustrating a first modification of the present invention.

Therefore, in a first modification shown in FIG. 8A, by bending the outlet 22 of the fuel passage 20, the position of the outlet 22 is set so as to be located above a fluid surface 30S of the fuel in the outer tank 30 when the position of the aircraft 1 is within the predetermined climb angle range. The outlet 22 is set at a front and upper position within the inner tank 40.

Accordingly, the outlet 22 of the fuel passage 20 is always opened within the inner tank 40 at a higher position than the fluid surface 30S in the outer tank 30 within the predetermined climb angle range in which there is a possibility of the occurrence of the unintended overflow. Thus, the unintended overflow does not occur even when the inlet 21 of the fuel passage 20 is immersed in the fuel. The fuel amounts in the outer tank 30 and the inner tank 40 are changed as expected based on the fuel consumption.

Influences on the control of the gravity center of the airframe can be avoided by preventing the unintended overflow.

When the unintended overflow occurs, the fuel in the outer tank 30 is reduced even though the first tank is supposed to store the full storage amount based on the fuel consumption amount, which may confuse a pilot viewing a display showing the fuel amount. Such unnecessary confusion can be also avoided.

Figure 8B:
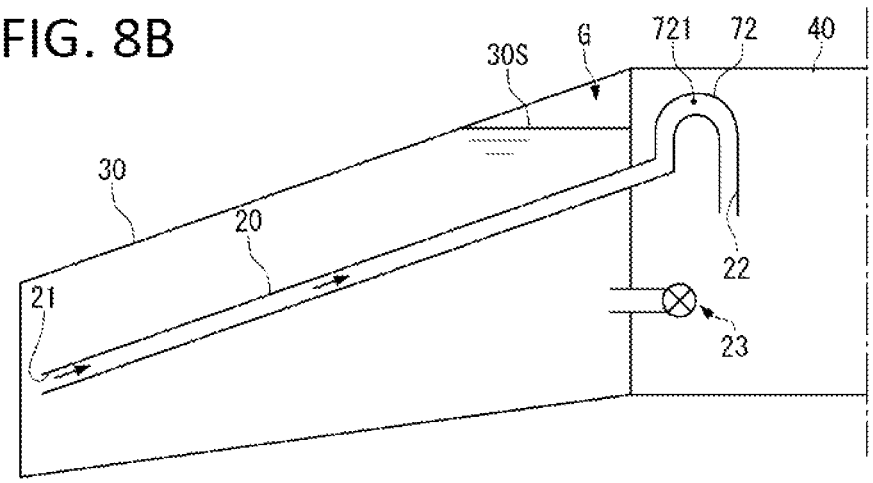
FIG. 8B is a schematic view illustrating a second modification of the present invention.

The configuration of a second modification shown in FIG. 8B may be also employed instead of the configuration shown in FIG. 8A as described above.

In FIG. 8B, the fuel passage 20 includes a fluid surface upper portion 72 in the vicinity of the outlet 22.

The fluid surface upper portion 72 is located above the fluid surface 30S of the fuel in the outer tank 30 when the position of the aircraft 1 is within the predetermined climb angle range. A vent hole 721 is formed in the fluid surface upper portion 72.

The outlet 22 of the fuel passage 20 is located below the fluid surface upper portion 72.

In accordance with the configuration in FIG. 8B, the fuel passage 20 is opened at a higher position than the fluid surface 30S of the fuel in the outer tank 30 by the vent hole 721 of the fluid surface upper portion 72. Thus, the unintended overflow can be prevented in a similar manner to the configuration in FIG. 8A.

Also, in accordance with the configuration in FIG. 8B, it is not necessary to arrange the outlet 22 itself above the fluid surface 30S in the outer tank 30. Thus, the outlet 22 can be arranged closer to the fluid surface (not shown) of the fuel in the inner tank 40. Accordingly, it is possible to avoid the occurrence of static electricity with the fuel flowing out of the outlet 22 and striking against the fluid surface.

Next, a specific configuration according to the second modification shown in FIG. 8B is described by reference to FIGS. 9 and 10.

Figure 9:
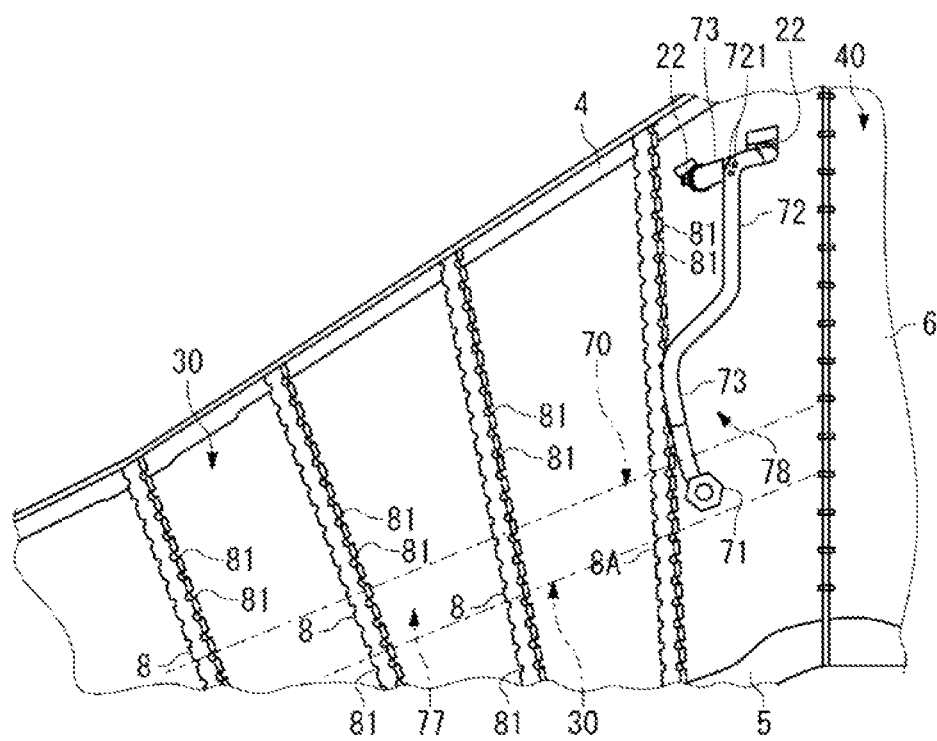
FIG. 9 is a view illustrating a specific configuration according to the second modification of the present invention.

FIG. 9 is a perspective view illustrating the inner sides of the outer tank 30 and the inner tank 40, and a region around the outlet of a fuel passage 70. In FIG. 9, the skin 6 is not shown, and the spars 4 and 5, the ribs 8, and the two stringers 7 (alternate long and two short dashes lines) constituting the fuel passage 70 are shown.

The outer tank 30 and the inner tank 40 are separated by a partition rib 8A. The cutouts 81 of the partition rib 8A are sealed by a plate material and a sealant material.

The fuel passage 70 includes the passage 77 that is formed inside the skin 6, the adjacent stringers 7 and 7, and the cover member 25, and a tube 78 that is connected to the passage 77.

The wing tip side of the passage 77 opens in the outer tank 30, and forms the inlet 21 of the passage 70 (FIG. 3). The passage 77 passes through the partition rib 8A, and is connected to the tube 78 within the inner tank 40.

Figure 10:
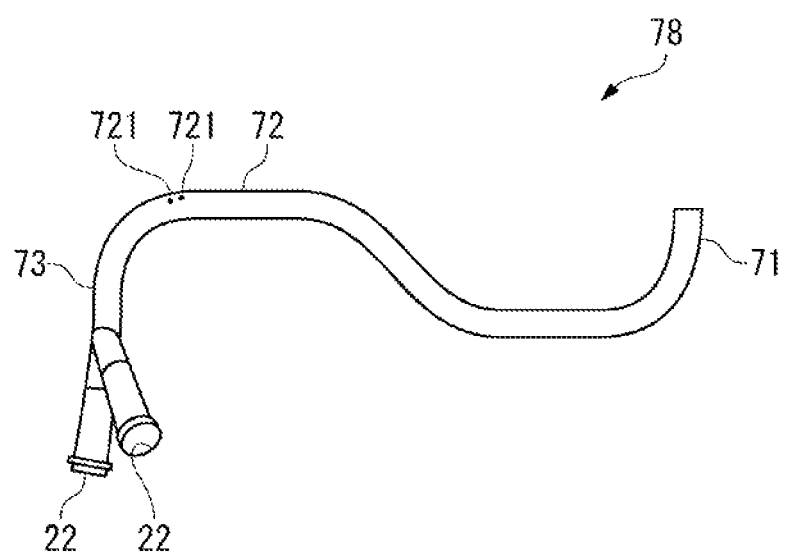
FIG. 10 is a view illustrating a tube used in the second modification.

The tube 78 includes a connection portion 71, the fluid surface upper portion 72, and an extension portion 73 as shown in FIG. 10. The tube 78 extends from the connection portion 71 by detouring around a peripheral member, rises toward the fluid surface upper portion 72, and thereafter extends downward in the extension portion 73.

The connection portion 71 is connected to the passage 77.

The small vent hole 721 is formed in the fluid surface upper portion 72. The vent hole 721 introduces a gaseous body in the inner tank 40 into the tube 78 so as to avoid the occurrence of a siphon phenomenon within the fuel passage 70. The vent hole 721 includes two vent holes so as to ensure the redundancy.

The fluid surface upper portion 72 is located above the fluid surface 30S of the fuel in the outer tank 30 when the aircraft 1 is within the predetermined climb angle range as described above. To be more specific, the fluid surface upper portion 72 is provided at an upper and front position within the inner tank 40. The position is calculated by simulation, computation or examination.

The extension portion 73 opens in the inner tank 40, and forms the outlet 22 of the fuel passage 70. The extension portion 73 is bifurcated, and includes the two outlets 22. Therefore, even when one of the outlets 22 is clogged, the fuel flow can be ensured by the other of the outlets 22. When the two or more outlets 22 are not provided, it is preferable to ensure the redundancy of the fuel flow by another method.

In an aircraft having no dihedral angle or sweepback angle, the fuel may flow back from the inner tank 40 to the outer tank 30 when the airframe is climbing unlike in the aircraft 1.

In this case, the fuel passage 20 may be opened within the inner tank 40 at a higher position than the fluid surface 30S of the fuel in the outer tank 30 in a similar manner to the configurations described with reference to FIGS. 8 to 10. For example, the outlet 22 of the fuel passage 20 may be provided in a front and upper portion in the inner tank 40.

The fuel system of the present invention may employ various tank configurations in addition to those described above.

Figure 11A:
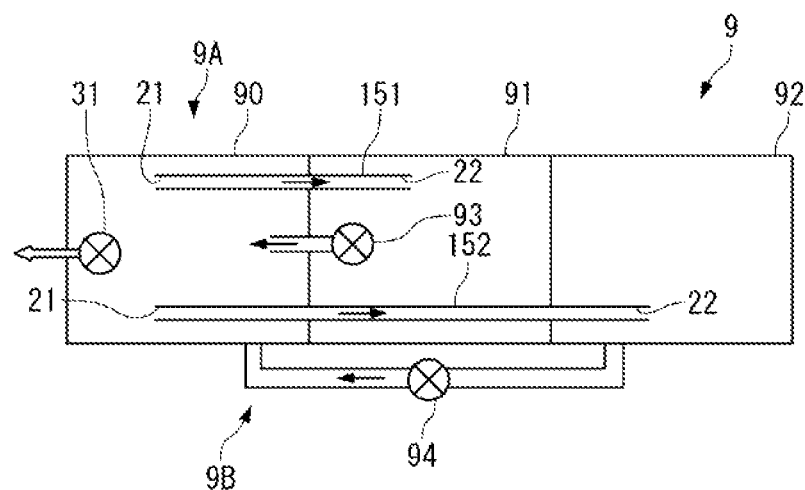
FIGS. 11A and 11B are views illustrating a fuel system including one main tank and two sub tanks.

For example, a fuel system 9 shown in FIG. 11A includes a main tank 90, a first sub tank 91, and a second sub tank 92.

The fuel system 9 also includes a fuel supply pump 31 that supplies fuel stored in the main tank 90 toward an engine, a first transfer pump 93, a second transfer pump 94, a first fuel passage 151, and a second fuel passage 152.

The first transfer pump 93 transfers the fuel from the first sub tank 91 to the main tank 90.

The second transfer pump 94 transfers the fuel from the second sub tank 92 to the main tank 90.

Both the first and second transfer pumps 93 and 94 are fluid pumps.

The first fuel passage 151 includes an inlet 21 that opens in the main tank 90, and an outlet 22 that opens in the first sub tank 91.

The second fuel passage 152 includes an inlet 21 that opens in the main tank 90, and an outlet 22 that opens in the second sub tank 92.

The fuel system 9 includes a first fuel system 9A including the first transfer pump 93 and the first fuel passage 151 between the main tank 90 and the first sub tank 91, and a second fuel system 9B including the second transfer pump 94 and the second fuel passage 152 between the main tank 90 and the second sub tank 92.

In the first fuel system 9A, the fuel is caused to overflow into the first sub tank 91 from the main tank 90 through the first fuel passage 151 while the fuel is being transferred from the first sub tank 91 to the main tank 90 by the first transfer pump 93.

In the second fuel system 9B, the fuel is caused to overflow into the second sub tank 92 from the main tank 90 through the second fuel passage 152 while the fuel is being transferred from the second sub tank 92 to the main tank 90 by the second transfer pump 94.

By using the first fuel system 9A and the second fuel system 9B, the fuel in the first sub tank 91 and the second sub tank 92 is consumed before the fuel in the main tank 90.

In the configuration shown in FIG. 11A, the first sub tank 91 is adjacent to the main tank 90, and the second sub tank 92 is adjacent to the first sub tank 91. Both the first sub tank 91 and the second sub tank 92 may be adjacent to the main tank 90 as shown in FIG. 11B.

Figure 11B:
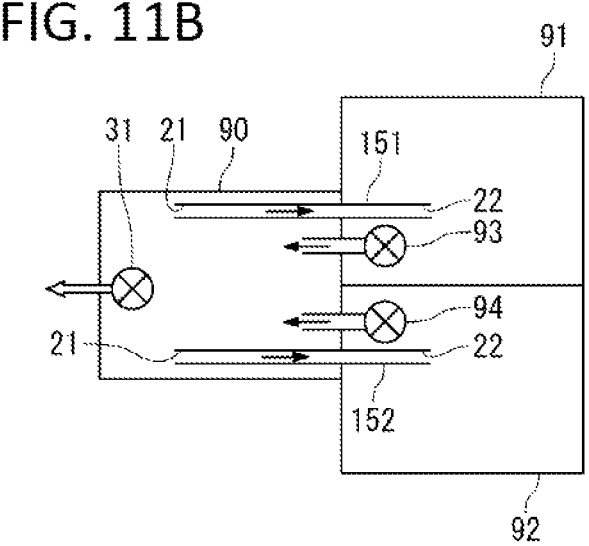

In the configurations shown in FIGS. 11A and 11B, the two sub tanks 91 and 92 are connected in parallel with the main tank 90. A configuration in which the tanks are connected in series as shown in FIG. 12 may be also employed.

Figure 12:
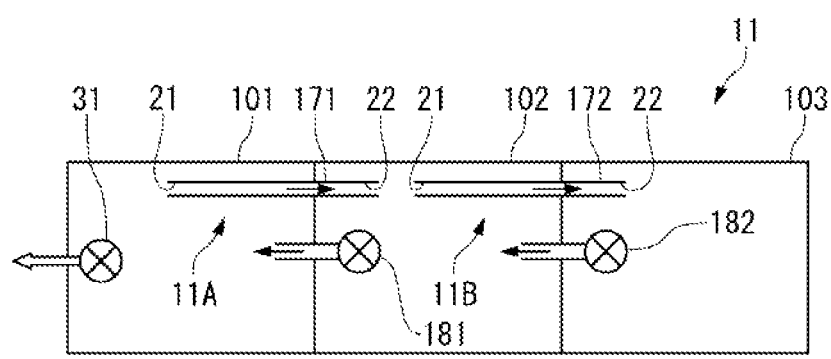
FIG. 12 is a view illustrating a fuel system including three tanks.

A fuel system 11 shown in FIG. 12 includes a tank 101, a tank 102, a tank 103, a fuel supply pump 31 that supplies fuel stored in the tank 101 toward an engine, a first transfer pump 181, a second transfer pump 182, a first fuel passage 171, and a second fuel passage 172.

The first transfer pump 181 transfers the fuel from the tank 102 to the tank 101.

The second transfer pump 182 transfers the fuel from the tank 103 to the tank 102.

The first fuel passage 171 includes an inlet 21 that opens in the tank 101, and an outlet 22 that opens in the tank 102.

The second fuel passage 172 includes an inlet 21 that opens in the tank 102, and an outlet 22 that opens in the tank 103.

The fuel system 11 includes a first fuel system 11A including the first transfer pump 181 and the first fuel passage 171 between the tank 101 and the tank 102, and a second fuel system 11B including the second transfer pump 182 and the second fuel passage 172 between the tank 102 and the tank 103.

In the first fuel system 11A, the tank 101 where the inlet 21 of the fuel passage 171 is located corresponds to the first tank, and the tank 102 where the outlet 22 of the fuel passage 171 is located corresponds to the second tank.

In the second fuel system 11B, the tank 102 where the inlet 21 of the fuel passage 172 is located corresponds to the first tank, and the tank 103 where the outlet 22 of the fuel passage 172 is located corresponds to the second tank.

By using the first fuel system 11A and the second fuel system 11B, the fuel can be consumed in the order of the tank 103, the tank 102, and the tank 101.

In the fuel system of the present invention, the fuel in the second tank is consumed before the fuel in the first tank. Therefore, the fuel system only needs to be provided with the fuel supply pump that supplies the fuel in the first tank toward the engine so as to supply at least the fuel in the first tank toward the engine.

It should be noted that the present invention also allows a configuration in which a fuel supply pump that supplies the fuel in the second tank toward the engine is provided in addition to the fuel supply pump that supplies the fuel in the first tank toward the engine.

Figure 13:
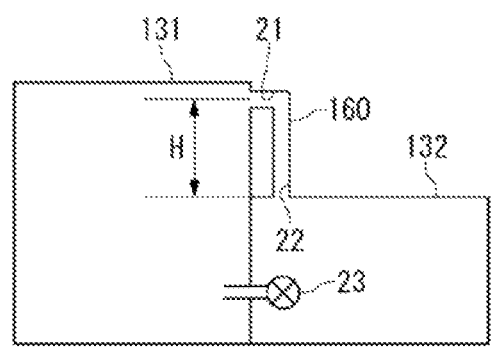
FIG. 13 is a view illustrating a fuel system according to a modification of the present invention.

As long as the fuel is enabled to overflow into the second tank from the first tank, the fuel passage of the present invention may be configured in any form. For example, a fuel passage 160 including an inlet 21 opening in a first tank 131, and an outlet 22 opening in a second tank 132, and extending in a vertical direction as shown in FIG. 13 may be employed. In this configuration, fuel in the first tank 131 overflows into the second tank 132 by gravity based on a height difference H between the inlet 21 and the outlet 22.

The fuel system of the present invention is not limited to the aircraft, and may be also applied to a transport machine such as a vessel. The fuel system may be also applied to a power system or the like including an engine generator.

The constitutions described in the embodiment described above may be also freely selected or changed into other constitutions without departing from the scope of the present invention.

What is claimed is:

1. A fuel system comprising:
a first tank and a second tank that respectively store fuel;
a fuel supply pump that supplies the fuel in the first tank out of the first tank to a fuel consuming section;
a transfer pump that transfers the fuel in the second tank into the first tank; and
a fuel passage having an inlet in communication with an inner portion of the first tank, and an outlet in communication with an inner portion of the second tank,
wherein the fuel passage permits the fuel in the first tank to overflow into the second tank through the fuel passage when an amount of the fuel in the first tank exceeds a predetermined storage amount,
wherein the fuel system is mounted on an aircraft and the fuel passage has a down grade from the inlet toward the outlet based on a dihedral angle of a main wing of the aircraft, and
wherein the fuel passage is an elongated conduit that extends within the first tank along a length of the first tank.

2. The fuel system according to claim 1,
wherein when an amount of the fuel in the first tank exceeds the predetermined storage amount, the fuel in the first tank overflows into the second tank through the fuel passage, and
the fuel stops overflowing into the second tank from the first tank after termination of the transfer of the fuel from the second tank to the first tank.

3. The fuel system according to claim 1, wherein the first tank is located outside the second tank on a right or left side of the second tank.

4. The fuel system according to claim 1, wherein the transfer pump is a jet pump.

5. The fuel system according to claim 1,
wherein a vent that leads to outside air is provided in at least one of the first tank and the second tank, and
one of the first tank and the second tank communicates with the vent provided in the other of the tanks through the fuel passage.

6. The fuel system according to claim 3,
wherein the aircraft includes a skin and a plurality of stringers that reinforce the skin, and
the fuel passage is formed inside the skin, the adjacent stringers, and a cover member that covers a gap between the adjacent stringers.

7. The fuel system according to claim 3,
wherein the main wing has the dihedral angle and a sweepback angle, and
the outlet of the fuel passage is located above a fluid surface of the fuel in the first tank when a position of the aircraft is within a predetermined range of a climb angle.

8. The fuel system according to claim 3,
wherein the main wing has the dihedral angle and a sweepback angle,
the fuel passage includes a fluid surface upper portion that is located above a fluid surface of the fuel in the first tank when a position of the aircraft is within a predetermined range of a climb angle in the vicinity of the outlet, and
a vent hole is formed in the fluid surface upper portion.

9. The fuel system according to claim 3,
wherein the main wing has the dihedral angle and a sweepback angle,
the fuel passage includes a fluid surface upper portion that is located above a fluid surface of the fuel in the first tank when a position of the aircraft is within a predetermined range of a climb angle in the vicinity of the outlet,
a vent hole is formed in the fluid surface upper portion, and
the outlet of the fuel passage is in the vicinity of a fluid surface of the fuel in the second tank.

10. The fuel system according to claim 3,
wherein the main wing has the dihedral angle and a sweepback angle,
the fuel passage includes a fluid surface upper portion that is located above a fluid surface of the fuel in the first tank when a position of the aircraft is within a predetermined range of a climb angle in the vicinity of the outlet,
a vent hole is formed in the fluid surface upper portion, and
the fuel passage comprises a plurality of outlets.

11. The fuel system according to claim 1, comprising a plurality of second tanks, wherein the second tanks are connected in parallel with the first tank.

12. The fuel system according to claim 1, comprising:
a plurality of second tanks;
a pump that transfers the fuel in one of the second tanks into other one of the second tanks; and
a fuel passage having an inlet in communication with the inner portion of the one of the second tanks, and an outlet in communication with an inner portion of the other one of the second tanks, wherein:
the fuel in the one of the second tanks is caused to overflow into the other one of the second tanks through the fuel passage; and
the second tanks are connected in series with the first tank.

13. A fuel system comprising:
a first tank and a second tank that respectively store fuel;
a fuel supply pump that supplies the fuel in the first tank out of the first tank to a fuel consuming section;
a transfer pump that transfers the fuel in the second tank into the first tank; and
a fuel passage having an inlet in communication with an inner portion of the first tank, and an outlet in communication with an inner portion of the second tank,
wherein the fuel passage permits the fuel in the first tank to overflow into the second tank through the fuel passage when an amount of the fuel in the first tank exceeds a predetermined storage amount, and
wherein the fuel passage is an elongated conduit that extends within the first tank along a length of the first tank and toward an upper region above a liquid surface of the fuel within the first tank.

14. The fuel system according to claim 1, wherein the fuel passage extends within the first tank along a substantial length of the first tank.

15. The fuel system according to claim 1, wherein the fuel passage extends within the first tank along a majority of a length of the first tank.

* * * * *